(12) United States Patent
Edge

(10) Patent No.: US 7,705,857 B2
(45) Date of Patent: Apr. 27, 2010

(54) METHOD AND APPARATUS FOR CHARACTERIZING AND CORRECTING FOR HUE SHIFTS IN SATURATED COLORS

(75) Inventor: Christopher J. Edge, St. Paul, MN (US)

(73) Assignee: Eastman Kodak Company, Rochester, NY (US)

(*) Notice: Subject to any disclaimer, the term of this patent is extended or adjusted under 35 U.S.C. 154(b) by 207 days.

(21) Appl. No.: 11/950,826

(22) Filed: Dec. 5, 2007

(65) Prior Publication Data

US 2009/0147328 A1    Jun. 11, 2009

(51) Int. Cl.
G09G 5/02 (2006.01)
G03F 3/08 (2006.01)

(52) U.S. Cl. .................. 345/604; 358/520; 345/591

(58) Field of Classification Search ........ 345/591, 345/604; 358/520
See application file for complete search history.

(56) References Cited

OTHER PUBLICATIONS

N.P.L. coulour-matching investigation: Final Report (1958); by W.S. Stiles & J.M. Burch, National Physical Laboratory, Teddington, Middlesex, pp. 1-26.
Interim Report to the Commission Internationale de l"Eclairage, Zurich, 1955, on the National Physical Laboratory's investigation of colour-matching (1955); W.S. Stiles O.B.E., D. Sc., pp. 168-181.
The spectral sensitivity of the human short-wavelength sensitive cones derived from thresholds and color matches. Andrew Stockman, Lindsay T. Sharpe, Clemens Fach, Vision Research 39 (1999) 2901-2927.
To Develop a Universal Gamut Mapping Algorithm, Jan Morovic, Oct. 1998 (thesis), pp. I-XII and 1-203.
CRC Chapter on Visual Psychophysics and Color Appearance, Garrett M. Johnson, Mark D. Fairchild, pp. 1-86, 2003.
Ugra Display Analysis and Certification Tool, User's Guide & Technical White Paper, May 2006.
Color Gamut Mapping in a Hue-Linearized CIELAB Color Space, Gustav J. Braun & Mark D. Fairchild; Munsell Color Science Laboratory, Chester F. Carlson Center for Imaging Science; Rochester Institute of Technology, Rochester NY, US, Fritz Ebner, Xerox Corporation, Webster, NY USA, 1998.
Optimizing Color-Matching Functions for Individual Observers Using a Variation Method, Nobuhito Matsushiro, Noboru Ohta, Mark Q. Shaw, and M.D. Fairchild, Munsell Color Science Laboratory, Center for Imaging Science, Rocheter Institute of Technology, Rochester, NY (pp. 472-480), 2001.

(Continued)

*Primary Examiner*—Benny Q Tieu
*Assistant Examiner*—Eric A Rust
(74) *Attorney, Agent, or Firm*—Nelson Adrian Blish

(57) ABSTRACT

A method for correcting for hue shifts includes parameterizing the conversion of long-medium-short (LMS) spectral sensitivities of the human eye to a human observer function, and applying a non-linear transformation between the LMS and human observer function in order to correct for the hue shifts. A system for correcting for hue shifts is also provided. The system includes a controller for parameterizing the conversion of LMS spectral sensitivities of the human eye to a human observer function and applying a non-linear transformation between the LMS and human observer function in order to correct for the hue shifts in the image. The system can also include an output device for presenting the hue corrected image.

8 Claims, 7 Drawing Sheets

OTHER PUBLICATIONS

A Top Down Description of S-CIELAB and CIEDE2000, Garrett M. Johnson, Mark D. Fairchild; Munsell Color Science Laboratroy, Chester f. Carlson Center for Imaging Science, Rochester Institute of Technology, Rochester, NY, 2002.

Color Appearance Models, Mark Fairchild, Addison-Wesley, Reading Mass., 1998, Chapter 9—Chromatic-adaptation Models, pp. 199-214 & Chapter 10, Color Appearance Models, p. 221.

Phychophysical Generation of Matching Images for Cross-Media Color Reproduction, Karen M. Braun & Mark D. Fairchild, chester F. Carlson Center for Imaging Science, Rochester Institute of Technology, Rochester, NY; the Fourth Color Imaging Conference: Color Science, Systems and Applications (p. 214-220), 1996.

A Novel Method for the Determination of Color Matching Functions, Mark D. Fairchild, Color Research and Application, vol. 14, No. 3, Jun. 1989; pp. 122-130.

Measuring Color-Matching Functions. Part I, vol. 18, No. 3, Jun. 1993; p. 155-162—Amy D. North, Mark D. Fairchild.

Measuring Color-Matching Functions. Part II. New Data for Assessing Observer Metamerism, vol. 18, No. 3, Jun. 1993, p. 163-170; Amy D. North & Mark D. Fairchild.

A Reprint from American Scientist the magazine of Sigma Xi, The Scientific Research Society; Charting Color from the Eye of the Beholder, Edward R. Landa & Mark D. Fairchild; American Scientist, vol. 93. p. 436-443, 2005.

International Color Consortium, Specification ICC.1:2004-10 (profile version 4.2.0.0), Image technology colour management—Architecture, profile format, and data structure; p. i-xiv, 1-98, 2004.

The iCAM Framework for Image Appearance, Image Differences, and Image Quality; Mark D. Fairchild & Garrett M. Johnson, p. 1-34, Jan. 2004.

Evaluating the 1931 CIE Color Matching Functions, Mark Shaw, Dr. Mark Fairchild; p. 1-22 (plus tables & figures), 1997.

Physiologically-based color matching functions, Andrew Stockman & Lindsay T. Sharpe, Institute of Ophthalmology, University College London; p. 1-2, ISCC/CIE Expert Symposium, May 16-17, 2006, Naqtional Reserach Council of Canada, Ottawa, Ontario, http://www.iscc.org/jubilee2006/.

Color Science: Concepts and methods, Quantitative Dta and Formulae, Wyszecki, Gunter, and Stiles, w.S., $2^{nd}$ Edition, John Wiley & Sons, NY 1982, Color-Matching Functions of Normal Trichromats, p. 345.

The Reproduction of Colour, R.W.G. Hunt, Fountain Press, England, $5^{th}$ Edtion, 1995, Colour Standards and Calculations, p. 138-141; A Model of Colour Vision for Practical Applications; Evaluating Colour Appearance, p. 706-707.

Colour & Vision Research Laboratories, Institute of Ophthalmology, UCL Website, http://cvrl.ucl.ac.uk/, Feb. 2006.

Finding constant hue surfaces in color space, Fritz Ebner and Mark D. Fairchild, SPIE vol. 3300, pp. 107-117, 1998.

Determination of Constant Hue Loci for a CRT Gamut and Their Predictions Using Color Appearance, Po-Chieh Hunt and Roy S. Berns, Color Research and Application, vol. 20, No. 5, Oct. 1995, CCC 0361-2317/95/050285-11 -pp. 285-295.

METHOD AND APPARATUS FOR CHARACTERIZING AND CORRECTING FOR HUE SHIFTS IN SATURATED COLORS

FIELD OF THE INVENTION

The present invention relates generally to a method and apparatus for characterizing and correcting for hue shifts in colors and more particularly to characterizing and correcting for the shifts in saturated colors such as saturated blue color.

BACKGROUND OF THE INVENTION

The Commission Internationale de l'Éclairage (hereinafter "CIE") XYZ observer functions are the basis for most color measurements that require the matching of colors. By combining these functions with non-linear color appearance models (CAMs) such as CIELAB and CIECAM96s CAMs, complex color images as well as simple color patches can be reproduced with great success.

The CIELAB model for example is reasonably effective in predicting the appearance of hue for colors ranging from near neutral to regions of high saturation with the exception of regions of extremely saturated blue color. For example, saturated blue images on computer displays will appear extremely purple if converted to CMYK printed images even though CIELAB measurements would indicate nearly identical values of hue. This phenomenon was documented by Hung and Berns in their paper "Determination of constant hue loci for a CRT gamut and their predictions using color appearance spaces", P. C. Hung and R. S. Berns, *Color Res. Appl.* 20, 285-295 (1995) and is therefore often referred to as the Hung-Berns effect.

Plots shown by Hung-Berns indicate a hue shift in blue that equates to 30 ΔE or more. Until now, this phenomenon has not been well understood and has been corrected using empirical spline corrections or similar techniques that at times do not provide for optimal correction. A need thus exists for characterizing and correcting for the effects of hue shifts in saturated colors, in particular blue colors, such as for example when performing color conversions from RGB images containing saturated blue and CMYK prints which are attempting to reproduce those RGB images.

SUMMARY OF THE INVENTION

Briefly, according to one aspect of the present invention a method for correcting for hue shifts includes parameterizing the conversion of long-medium-short (LMS) spectral sensitivities of the human eye to a human observer function; and applying a non-linear transformation between the LMS and human observer function in order to correct for the hue shifts.

In another aspect of the invention a system for correcting for shifts in hue in an image includes a controller for parameterizing the conversion of long-medium-short (LMS) spectral sensitivities of the human eye to a human observer function. The controller also applies a non-linear transformation between the LMS and human observer function in order to correct for the hue shifts in the image. The system also includes an output device for presenting the hue corrected image.

These and other objects, features, and advantages of the present invention will become apparent to those skilled in the art upon a reading of the following detailed description when taken in conjunction with the drawings wherein there is shown and described an illustrative embodiment of the invention.

DETAILED DESCRIPTION OF THE INVENTION

Figure 1:
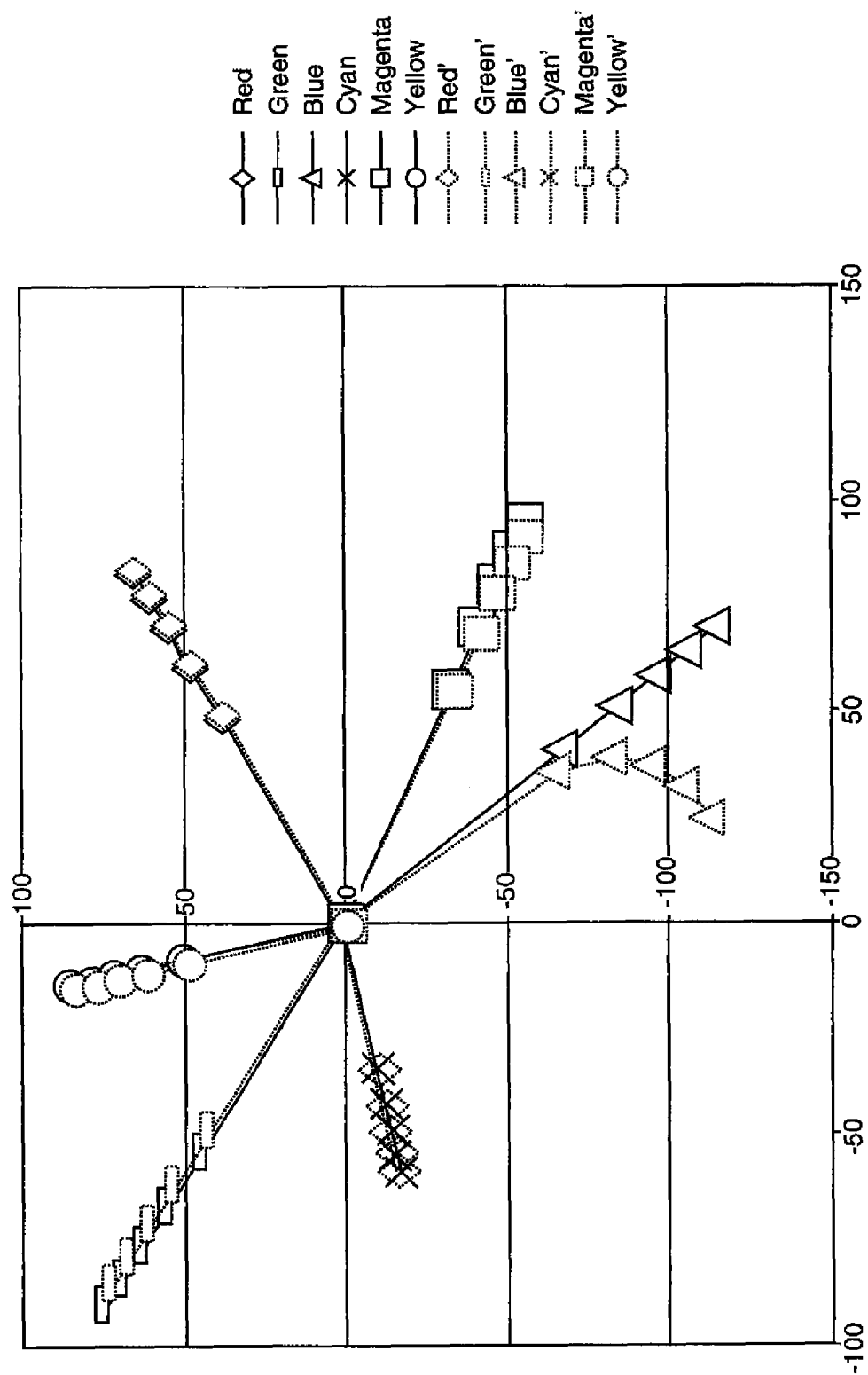
FIG. 1 shows a plot of lines of constant xy with varying Y for sRGB with and without beta correction in accordance with an embodiment of the invention.

The present description is directed in particular to elements forming part of, or cooperating more directly with, methods and/or apparatus in accordance with the invention. It is to be understood that elements not specifically shown or described may take various forms well known to those skilled in the art.

The color matching functions of the CIE 1931 standard were based on the data of Guild (1931) using 7 observers and Wright (1928-1929) using 10 observers (also referred hereinafter as "G & W") together with the CIE 1924 luminous efficiency function, V(λ). As a result of visual vs. numerical discrepancies in the matching of paper white, W. S. Stiles and J. M. Burch in their paper entitled "NPL colour matching investigation: Final Report (1958), *Optica Acta* 6, 1-26 preformed a "pilot" repeat of the 1931 determination of the color matching functions using 10 observers and a "final" version using 49 observers. This latter "final" experiment was performed using a larger field of view (10-degree rather than 2-degree) and hence the two standards from 1931 and 1958 are referred to as the 2 and 10-degree observer, respectively. Although the procedures used in 1928-1931 and 1955-1958 had some differences between them, the fundamental approach was the same. This comprised of using a basis set of three monochromatic colors that were representative of red, green, and blue to match a variety of reference colors, in particular, a sampling of the visible colors of the spectrum (390 nm-730 nm). Thus, three Color Matching Functions ("CMFs") would be defined and interpolated based on the relative intensities of red, green, and blue light required to match each reference color of wavelength λ. It was immediately recognized that the CMFs for red, green, and blue could be either positive or negative for a given reference color of wavelength λ.

This seemingly contradictory result stems from the fact that many monochromatic colors of the spectrum are too "pure" or "saturated" to be represented as the sum of three RGB monochromatic light sources. However, we can infer negative values by means of the law of additives, which states that if spectra $S_A(\lambda)$ visually matches spectra $S_B(\lambda)$ and spectra $S_C(\lambda)$ visually matches spectra $S_D(\lambda)$ when scaled by values a, b, c, and d respectively:

$$aS_A(\lambda) \Leftrightarrow bS_B(\lambda)$$
$$cS_C(\lambda) \Leftrightarrow dS_D(\lambda) \quad \text{Eq. 1}$$

then $$aS_A(\lambda)+cS_C(\lambda) \Leftrightarrow bS_B(\lambda)+dS_D(\lambda) \quad \text{Eq. 2}$$

Equivalently, $$aS_A(\lambda) \Leftrightarrow bS_B(\lambda)+dS_D(\lambda)-cS_C(\lambda) \quad \text{Eq. 3}$$

If a good match is achieved by adding one of the tristimulous colors to the reference color of wavelength λ in order to reduce its perceived saturation, this quantity may be interpreted as a negative value. In this manner, the three CMFs can be determined for a given set of tristimulous wavelengths. Thus for every wavelength λ of the visible spectrum, a unique vector comprising of 3 values R(λ), G(λ), and B(λ) is determined which will ensure a good visual match between the reference color of wavelength λ and the three combined wavelengths $\lambda_R$, $\lambda_G$, and $\lambda_B$.

The original work of G & W from 1931 was performed using wavelengths of 650, 530, and 460 nm. The published CMF results were converted from CMFs based on 650, 530, and 460 wavelengths to CMFs based on wavelengths 700, 546.1, and 435.8. The reason for this perhaps was the desire to describe the CMFs using as large a gamut as possible. The impact of this choice of tristimulous wavelengths was that the relative radiant power of the red, green, blue light sources had to be set to 72.0962:1.3791:1. This is due to the insensitivity of the eye to deep red colors of wavelength 700 nm.

The subsequent work of Stiles and Burch ("S & B") performed in 1955-1958 utilized wavelengths $\lambda_R$=645.2 nm, $\lambda_G$=525.3 nm, and $\lambda_B$=444.4 nm. Unlike the work done by G&W, the results of S&B are always presented as CMFs whose primary wavelengths are the same as the actual experiment. Since the eye is much more sensitive to $\lambda_R$=645.2 nm than it is to $\lambda_R$=700 nm, the data of S&B can be plotted with no scaling for radiant power. It is assumed that all reference colors of wavelength λ have the same magnitude of radiant power, normalized to value 1. This ensures that the value of the R, G, and B CMFs at wavelengths $\lambda_R$=645.2 nm, $\lambda_G$=525.3 nm, and $\lambda_B$=444.4 respectively will (by definition) be of value 1, with the remaining two CMF values being set to 0. The above CMFs were determined from an initial set of 10 subjects using a 2-degree field. Subsequently, the experiment was repeated using 49 subjects with a 10-degree field.

In both studies, the CIE proceeded to create a set of non-physical tristimulous light sources that would always result in positive values for the corresponding CMFs. The means by which these new CMFs were determined was rather complex. In general, one may say that the predominantly "green" function (Y) was optimized to represent V(λ), the photopic sensitivity of the eye based on flicker experiments, and the predominantly red (X) and blue (Z) functions were chosen to ensure tangential lines in chromaticity space along the green/yellow/red boundary of the visible color gamut and a line tangential to the "greenest" color of the spectrum. Thus, for purposes of this invention, we will identify XYZ as red, gray, blue as opposed to red, green, blue.

The matrices to convert the 2-degree 1931 CMFs to XYZ and the 10-degree 1958 CMFs to XYZ are given by:

$$M_{RGB \to XYZ} = 5.65 \begin{pmatrix} 0.49 & 0.31 & 0.2 \\ 0.17697 & 0.8124 & 0.01063 \\ 0 & 0.01 & 0.99 \end{pmatrix} \text{(2 degree)} \quad \text{Eq. 4}$$

$$M_{RGB \to XYZ} = \begin{pmatrix} 0.341 & 0.189 & 0.387 \\ 0.139 & 0.837 & 0.073 \\ 0 & 0.0395 & 2.03 \end{pmatrix} \text{(10 degree)}$$

The two matrices of Eq. 4 are significantly different due to the different red, green, blue primary wavelengths used to characterize the 1931 vs. the 1955-1958 RGB CMFs. It appears that the 10-degree observer functions should be regarded as more accurate versions (at least in theory) of the generalized XYZ observer functions.

A summary of the previous discussion is as follows:

1. Once one accepts that the law of spectral additivity can be used to define positive and negative values of R, G, and B, any reasonable color set of $\lambda_R$, $\lambda_G$, and $\lambda_B$ can be used to uniquely identify and quantify all visible colors. By "reasonable" it is meant values that are clearly in the general vicinity of red, green, and blue. More precisely, any set of 3 colors can be used in which none of the 3 colors can be visually matched by a combination of the other two colors.
2. There are an infinite number of possible standards i.e. CMFs that could be defined for purposes of defining color, each with its own set of $\lambda_R$, $\lambda_G$, and $\lambda_B$.
3. The CIE defined a set of non-physical large gamut RGB light sources to create a set of CMFs (known as XYZ) that will always be positive. Other constraints were applied in order to determine the specific RGB->XYZ conversion matrix that resulted in the CIE XYZ observer functions, both for 2-degree and 10-degree.

By comparing the red, green and blue spectral sensitivities of the cones with the existing XYZ observer functions, color model experts such as R. W. G. Hunt define a conversion (i.e., Hunt-Estevez-Pointer conversion) that converts the XYZ observer functions to the long-medium-short spectral sensitivities of the eye, LMS (as defined in most prior art references) or equivalently ρ, β, γ (the labels Hunt prefers in order to avoid confusion with other color variables, such as using "L" for luminance). These functions defining LMS or ρβγ ply are used to create a fairly complex opponent-based color model. The so-called Hunt-Estevez-Pointer matrix is defined as:

$$M_{XYZ \to LMS} = \begin{pmatrix} 0.38971 & 0.68898 & -0.07868 \\ -0.22981 & 1.18340 & 0.04641 \\ 0 & 0 & 1.00 \end{pmatrix} \quad \text{Eq. 5}$$

The process by which CAMs begin their calculations can be traced back to the original CMFs as follows:

$$\text{CMFs->XYZ->LMS->CAMs} \quad \text{Eq. 6}$$

Thus, the fundamental responses of the eye LMS (or ρ, β, γ) are typically calculated from the XYZ functions rather than vice versa.

In their current form, all CAMs depend on the validity of the XYZ observer functions as their starting point. All the CAMs have in common an acknowledgement that the just noticeable difference (JND) response of the eye is non-linear, approximately logarithmic. The newer more complex CAMs were created to address apparent deficiencies and lack of visual uniformity of the most common and simple CAM that is the CIELAB version.

Clarifying the Mathematical Formalism for Color Matching

The $\vec{\lambda}_T$ vector refers to the choice of tristimulus wavelengths used to match a color of wavelength $\lambda$. The components of the vector RGB($\lambda$, $\vec{\lambda}_T$) are the magnitudes of the tristimulus wavelengths required to match the color of wavelength $\lambda$. These components are by definition the CMFs for the particular tristimulus wavelengths $\vec{\lambda}_T$. In a similar manner, we define vector functions for XYZ and LMS:

$$\vec{\lambda}_T = \begin{pmatrix} \lambda_r \\ \lambda_g \\ \lambda_b \end{pmatrix} \quad \text{Eq. 7}$$

$$\overrightarrow{RGB}(\lambda, \vec{\lambda}_T) = \begin{pmatrix} R(\lambda, \vec{\lambda}_T) \\ G(\lambda, \vec{\lambda}_T) \\ B(\lambda, \vec{\lambda}_T) \end{pmatrix}$$

$$\overrightarrow{XYZ}(\lambda) = \begin{pmatrix} X(\lambda) \\ Y(\lambda) \\ Z(\lambda) \end{pmatrix}$$

$$\overrightarrow{LMS}(\lambda) = \begin{pmatrix} L(\lambda) \\ M(\lambda) \\ S(\lambda) \end{pmatrix}$$

When it is determined that a given set of R,G, B magnitudes of tristimulous colors $\vec{\lambda}_T$ match a reference color of wavelength $\lambda$, the values of XYZ for the matching colors must be equal, which implies the following:

$$\overrightarrow{XYZ}(\lambda) = R(\lambda, \vec{\lambda}_T) \begin{pmatrix} X(\lambda_r) \\ Y(\lambda_r) \\ Z(\lambda_r) \end{pmatrix} + G(\lambda, \vec{\lambda}_T) \begin{pmatrix} X(\lambda_g) \\ Y(\lambda_g) \\ Z(\lambda_g) \end{pmatrix} + \quad \text{Eq. 8}$$

$$B(\lambda, \vec{\lambda}_T) \begin{pmatrix} X(\lambda_b) \\ Y(\lambda_b) \\ Z(\lambda_b) \end{pmatrix}$$

$$= M_{XYZ}(\vec{\lambda}_T) \overrightarrow{RGB}(\lambda, \vec{\lambda}_T)$$

where $$M_{XYZ}(\vec{\lambda}_T) = \begin{pmatrix} X(\lambda_r) & X(\lambda_g) & X(\lambda_b) \\ Y(\lambda_r) & Y(\lambda_g) & Y(\lambda_b) \\ Z(\lambda_r) & Z(\lambda_g) & Z(\lambda_b) \end{pmatrix} \quad \text{Eq. 9}$$

The predicted CMFs are therefore given by:

$$\overrightarrow{RGB}(\lambda, \vec{\lambda}_T) = M_{XYZ}^{-1}(\vec{\lambda}_T) \overrightarrow{XYZ}(\lambda) \quad \text{Eq. 10}$$

Thus, there is a well-defined relationship between a given choice of XYZ observer functions (for example 2-degree and 10-degree) and the CMFs that should be observed for a given set of tristimulus wavelengths $\vec{\lambda}_T$. The above relationship implies that all CMFs are linear transforms of one another:

$$\begin{aligned} \overrightarrow{RGB}(\lambda, \vec{\lambda}_{T_1}) &= M_{XYZ}^{-1}(\vec{\lambda}_{T_1}) \overrightarrow{XYZ}(\lambda) \\ &= M_{XYZ}^{-1}(\vec{\lambda}_{T_1}) M_{XYZ}(\vec{\lambda}_{T_2}) M_{XYZ}^{-1}(\vec{\lambda}_{T_2}) \overrightarrow{XYZ}(\lambda) \\ &= M_{XYZ}^{-1}(\vec{\lambda}_{T_1}) M_{XYZ}(\vec{\lambda}_{T_2}) \overrightarrow{RGB}(\lambda, \vec{\lambda}_{T_2}) \end{aligned} \quad \text{Eq. 11}$$

This also implies that color matching is dependent only on the LMS sensitivities of the eye and is independent on the conversion matrix from CMFs to XYZ or LMS to XYZ:

$$\begin{aligned} \overrightarrow{RGB}(\lambda, \vec{\lambda}_T) &= M_{XYZ}^{-1}(\vec{\lambda}_T) \overrightarrow{XYZ}(\lambda) \\ &= M_{XYZ}^{-1}(\vec{\lambda}_T) M_{XYZ \to LMS}^{-1} \overrightarrow{LMS}(\lambda) \\ &= \left( M_{XYZ \to LMS}^{-1} M_{LMS}(\vec{\lambda}_T) \right)^{-1} M_{XYZ \to LMS}^{-1} \overrightarrow{LMS}(\lambda) \\ &= M_{LMS}^{-1}(\vec{\lambda}_T)(M_{XYZ \to LMS}^{-1})^{-1} M_{XYZ \to LMS}^{-1} \overrightarrow{LMS}(\lambda) \\ &= M_{LMS}^{-1}(\vec{\lambda}_T) M_{XYZ \to LMS} M_{XYZ \to LMS}^{-1} \overrightarrow{LMS}(\lambda) \\ &= M_{LMS}^{-1}(\vec{\lambda}_T) \overrightarrow{LMS}(\lambda) \end{aligned} \quad \text{Eq. 12}$$

where $$M_{LMS}(\vec{\lambda}_T) = \begin{pmatrix} L(\lambda_r) & L(\lambda_g) & L(\lambda_b) \\ M(\lambda_r) & M(\lambda_g) & M(\lambda_b) \\ S(\lambda_r) & S(\lambda_g) & S(\lambda_b) \end{pmatrix} \quad \text{Eq. 13}$$

Implications of LMS vs. XYZ for CAMs

Summarizing the key implications of equation 12 and the previous discussion, the LMS($\lambda$) functions describing the cone responses of the human retina uniquely define color matching between different spectra, whether those spectra are comprised of combinations of intense narrow band wavelengths or less intense broad band distributions.

As mentioned previously, the legacy of CIE XYZ defines a sensation of red, gray, and blue which for convenience we will hereinafter label as "RgB" as opposed to "RGB" for red, green, and blue. Whereas LMS($\lambda$) is inherently "RGB-like" in property, XYZ($\lambda$) is inherently "RgB-like" in property. Whereas the LMS($\lambda$) function defines the matching of colors, the "RgB" functions of the eye + brain system which we associate with the historical XYZ($\lambda$) human observer functions define how colors are perceived. Characteristics such as hue relate directly back to XYZ($\lambda$). This means that to the extant that current models such as CIELAB appear to fail in the area of perception of hue, one may assume that there may be errors in our assumptions regarding the definition of the XYZ($\lambda$) human observer functions, both for 2-degree and 10-degree observations.

There is evidence of a perceived hue shift, particularly in the hues of blues as one progresses from neutrality to maximum blue chroma. Some experts speculate that the source of the apparent discrepancy is the much higher chroma of CRT blue (b*=−100.0) vs. the Munsell colors (b*=−40.0). A quick demonstration of this phenomenon can be made by mixing values of neutral gray (R=G=B) with blue (G=B=0) on a display using PhotoShop™ software or other similar software package in a linear RGB space (gamma=1.0). Whereas the saturated blue appears neither strongly red nor green shifted, by comparison the less saturated values of blue appear significantly more purple (i.e. there is a strong perception of red sensation). This correlates to the results of previous studies in the field which indicate a strong green shift (−a*) must be applied to less saturated blues in order to maintain the visual hue of saturated regions of blue.

Given the above discussion, the current definitions for the CIE observer functions XYZ(λ) do not appear to preserve constant lines of hue, particularly in regions of blue when transformed into values of CIELAB or other models. However, since the previous analysis indicates that color matching depends on LMS and color perception is directly governed by the relationship of LMS->XYZ, we can make an assumption that CIELAB in it's current form is not the primary source of the lack of hue constancy, but rather the conversion of LMS->XYZ (and therefore the fundamental definition of the human observer functions XYZ(λ)) must be revised. If indeed this is true, the advantage would be that much of the existing infrastructure for calculating CIELAB can remain the same, while the characterization and correcting for hue shifts can be improved in accordance with the invention.

The strong red sensation in the eye + brain system for less saturated values of blue compared to saturated values of blue lead to the conclusion that the CIE observer functions XYZ (λ) are not static, but rather may change as a function of the cone stimulations LMS(λ). In order to consider what issues regarding constancy of hue relate to XYZ itself and which issues relate to how CIELAB or other models processes XYZ, in one embodiment of the invention we postulate that the lines extending in XYZ space from saturated colors to neutral should be straight in CIELAB. In other words, hue should remain constant when approaching RGB=0, as well as when blending saturated color XYZ with $XYZ_{gray}$ or $XYZ_{white}$:

$$\overrightarrow{XYZ'} = \alpha \overrightarrow{XYZ}$$

$$\overrightarrow{XYZ'} = \alpha \overrightarrow{XYZ} + (1-\alpha)\overrightarrow{XYZ}_{gray}$$

$$\overrightarrow{XYZ'} = \alpha \overrightarrow{XYZ} + (1-\alpha)\overrightarrow{XYZ}_{white} \quad \text{Eq. 14}$$

Lines of color should be straight for all the above as α varies from 0 to 1.0. Plots of constant hue based on Hung-Berns experimental data are similar to the plots created from linear blends of saturated colors with gray in XYZ space, with the exception of the large shift in blue based on Hung-Berns. We assume therefore that the non-linearities in the non-blue regions are primarily related to the definition of CIELAB, whereas the large blue shift implies a fundamental modification to the definition of the XYZ observer functions.

As demonstrated in equation 12, color matching is uniquely determined by the cone LMS(λ) sensitivities. However, the matrix conversion of LMS->XYZ is not static and the cross contamination and subtracting of the cones which result in the sensation of red, gray, and blue in the human eye + brain system may change with the spectral properties of the observed color stimulus. In one embodiment that this can be expressed as:

$$\overrightarrow{XYZ} = M_{LMS \to XYZ}(S(\lambda))\overrightarrow{LMS} \quad \text{Eq. 15}$$

for individual colors. The generalized definition of the observer functions XYZ(λ) can be then be expressed or described in terms of parameters or parameterized as:

$$\begin{pmatrix} X(\lambda) \\ Y(\lambda) \\ Z(\lambda) \end{pmatrix} = M_{LMS \to XYZ}(s(\lambda')) \begin{pmatrix} L(\lambda) \\ M(\lambda) \\ S(\lambda) \end{pmatrix} \quad \text{Eq. 16}$$

where s(λ') is the measured spectra of the color stimulus and M is the LMS to XYZ conversion matrix modified to vary as a function of observed spectral stimulant. The above expression constrains the manner in which the observer functions will vary as a function of the observed stimulus. In this embodiment we also assume that any slight changes to the LMS->XYZ matrix will be based on the values of the cone stimuli LMS(λ). We will also assume that the change is small to moderate and therefore we write for convenience:

$$\begin{pmatrix} X(\lambda) \\ Y(\lambda) \\ Z(\lambda) \end{pmatrix} = (M_{LMS \to XYZ} + \Delta M_{LMS \to XYZ}(\overrightarrow{LMS})) \begin{pmatrix} L(\lambda) \\ M(\lambda) \\ S(\lambda) \end{pmatrix} \quad \text{Eq. 17}$$

In other words, the definition of XYZ(λ) and LMS(λ) is inherently spectral, however the delta correction to M is inherently a function of the integrated stimuli LMS. This means that if the only data available is XYZ, the data can be converted from:

$$\text{XYZ->LMS->(XYZ+}\Delta\text{XYZ)}. \quad \text{Eq. 18}$$

In one embodiment we next propose a modification to the traditional static form of the LMS->XYZ matrix in order to obtain good agreement between the experimental data and the calculated values of XYZ. For simplicity, we focus only on the blue correction in one embodiment however other embodiments of the invention can include correction for other colors. Blue is chosen for correction herein as an illustrative example because in the testing performed by Berns, only the blue correction appeared to be significantly better than CIELAB for both images and Munsell colors of constant hue. The following parameterized model can be then be used to define the shift towards red that occurs for blue colors approaching neutral:

$$\Delta M_{LMS \to XYZ}(\beta) = \begin{pmatrix} 0.202\beta & 0.0 & -0.202\beta \\ 0.0 & 0.0 & 0.0 \\ 0.0 & 0.0 & 0.0 \end{pmatrix} \quad \text{Eq. 19}$$

It should be noted that although the paramterized model of Eq. 1, is shown with specific values within the matrix, other values may be applied inside of the matrix if another saturated color is being adjusted for as an example.

The Fairchild data and corresponding empirical correction look up table is inherently 3D and assumes constant hue for constant blue chromaticity as L*->0. The Berns look up table however is inherently 2D and is constant for same values of hue and chroma with different values of L*. Since both data and practice appears to be somewhat unclear, we proposed three options for calculating β in the above matrix ΔM. Testing with actual complex imagery as well as with simple hue matching experiments will confirm which description best matches the perception of blue with decreasing saturation.

The following simple correction results in blue hues shifting towards a*=0 with increased saturation starting from dark neutral (RGB=0), with reduced shift when starting from lighter neutral colors:

$$\beta=\beta_0 \max(0, S-\max(L,M)) \quad \text{Eq. 20}$$

This simple calculation has the property of being linear in LMS, approaching 1.0 for predominantly blue colors (S->1, L->0,M->0), approaching 0 for S approaching the value of either L or M (i.e. approaching all non-blue regions of color including neutral), and becoming 0 for L or M>S.

For $\beta_0=0.70$, the effects of the above correction are shown in the plot of FIG. 1. Some of the raw data used to validate the present invention in the following illustrative plots comes from data values provided by Dr. Roy S Berns which where previously used in a publication entitled "Determination of Constant Hue for a CRT Gamut and their Predictions using Color Appearance Spaces", Color Research and Application, 20(5), pgs. 285-295, 1995, by Po-Chieh Hung and Roy S. Berns. In the plot shown in FIG. 1, lines of constant xy are calculated for an sRGB display in a*b* for RGB ranging from RGB (saturated) to RGB=0, in other words lines of constant chromaticity xy and Y ranging from Y of saturated RGB to Y=0. Since the value of xy stays constant, one would assume such a gradation would have constant hue if the observer functions XYZ remained constant.

Figure 2:
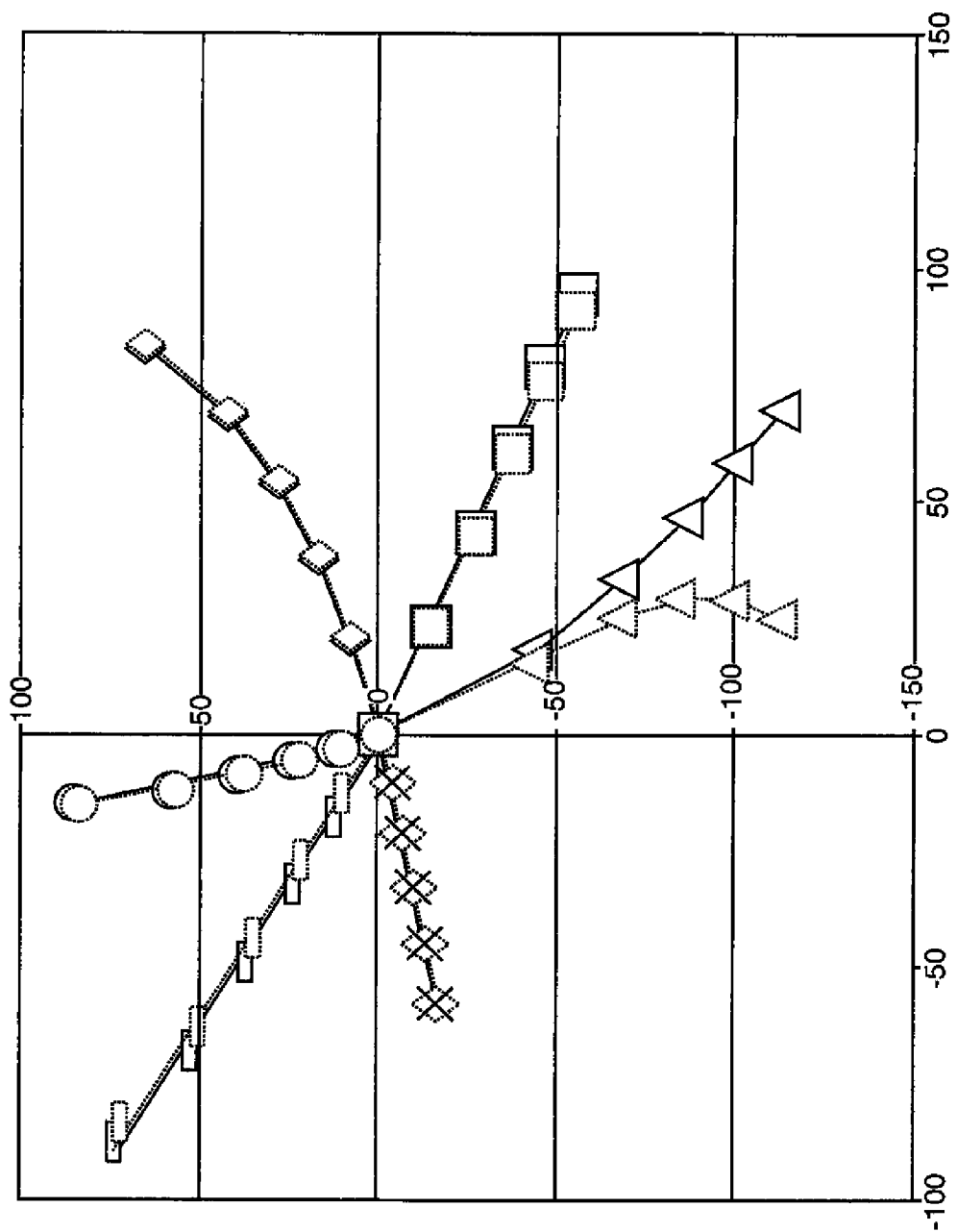
FIG. 2 shows a plot of lines of sRGB color ranging from saturated to gray with constant Y with and without beta correction in accordance with an embodiment of the invention.
Figure 3:
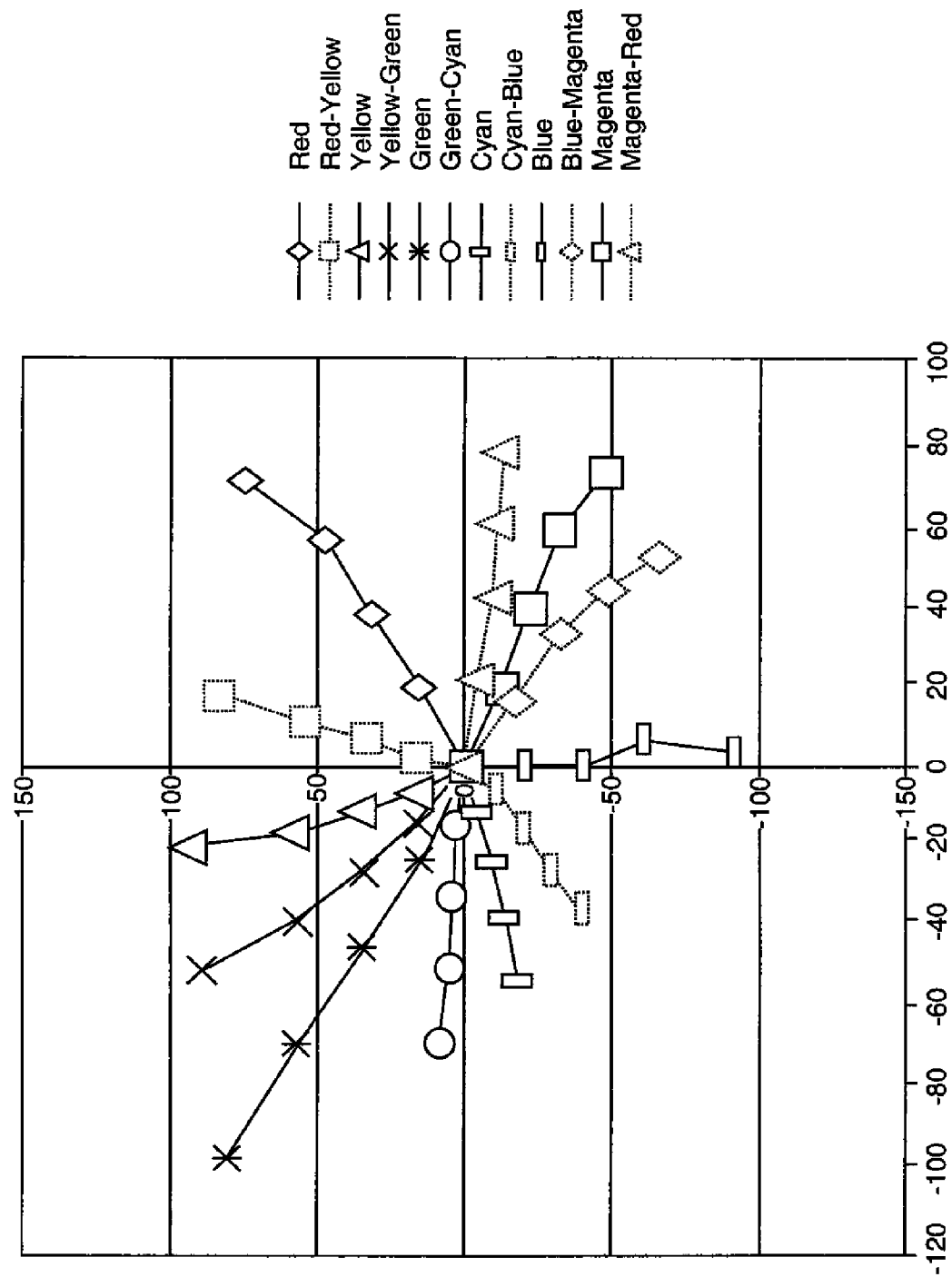
FIG. 3 shows a plot of lines of constant hue as documented by Hung-Berns with beta correction in accordance with an embodiment of the invention.

The second plot shown in FIG. 2 was calculated assuming a linear alpha blend of XYZ (saturated) +XYZ (gray) where the value of XYZ (gray) has the same value of Y as the saturated XYZ color. Intuitively, if the XYZ observer functions are constant, one would expect that performing such linear combinations would also be constant in hue. In the third plot shown in FIG. 3, the Hung-Berns lines of constant hue with the above correction of one embodiment of the invention applied are shown. As shown in the plots, the lines of constant hue for blue are greatly improved. The non-linearity of cyan is also improved.

In an alternative embodiment of the invention, the correction performed is similar to the above except that it is based on LMS chromaticities (referred to as "lms") rather than on LMS themselves. This means that for any given color, the hue correction is independent of the luminosity for that color. For example, this would mean that when viewing a pure R, G, or B color on a monitor, the hue would remain constant as one varied the intensity of that pure R, G, or B value. The Fairchild data and corresponding 3D correction would support this approach, whereas the Berns 2D correction would be closer to the previously described correction.

The alternative correction technique has similar boundary conditions to the previous correction technique and results in lines of constant hue for blues ranging from RGB=0 to saturated blue (i.e. constant blue xy, variable Y) but demonstrates blue hue shifts similar to above when starting from lighter neutral regions, wherein l, m and s are chromaticities based on LMS and k is an exponential correction to account for non-linear variations in correction factor $\beta$:

$$\beta=\beta_0 \max(0, s-\max(l,m))^\kappa \quad \text{Eq. 21}$$

where we define chromaticities based on LMS using lower case lms, analogous to the xyz chromaticities derived from XYZ:

$$\vec{lms}=\vec{LMS}/(L+M+S) \quad \text{Eq. 22}$$

Figure 4:
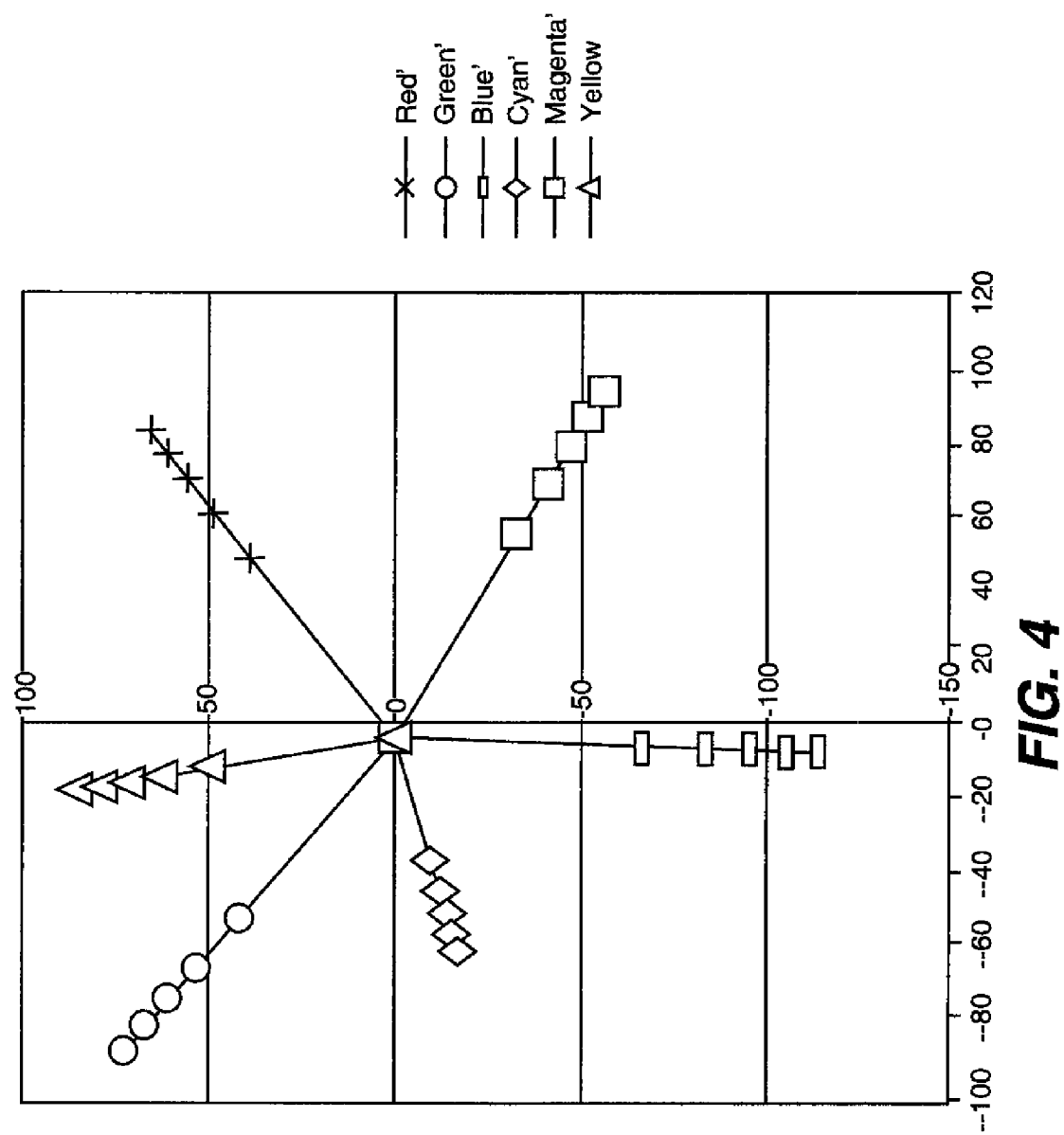
FIG. 4 shows a plot of constant xy with varying Y for sRGB showing no effect from beta correction in accordance with an embodiment of the invention.
Figure 5:
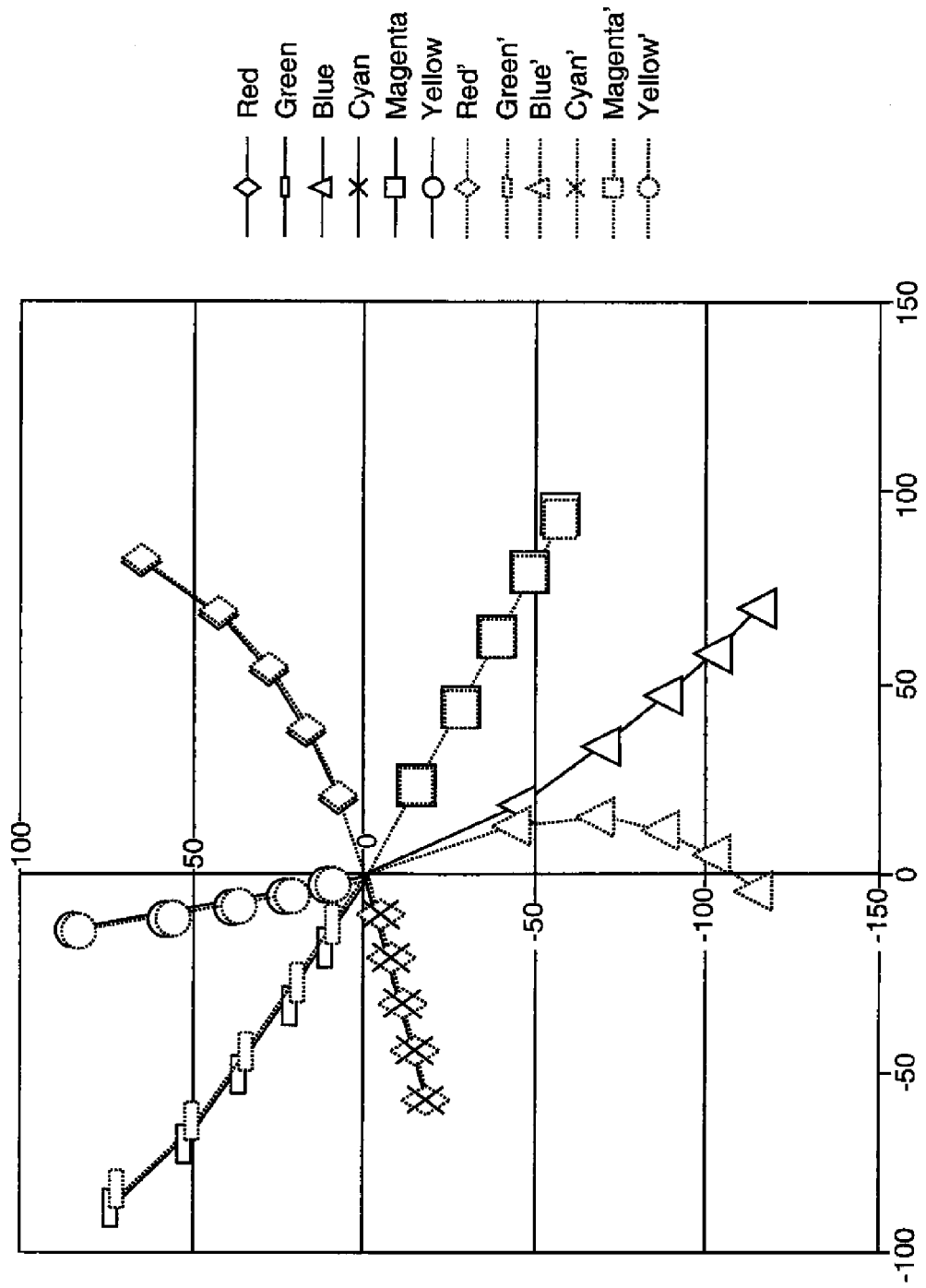
FIG. 5 shows a plot of lines of sRGB color ranging from saturated to gray with constant Y with and without beta correction in accordance with an embodiment of the invention.
Figure 6:
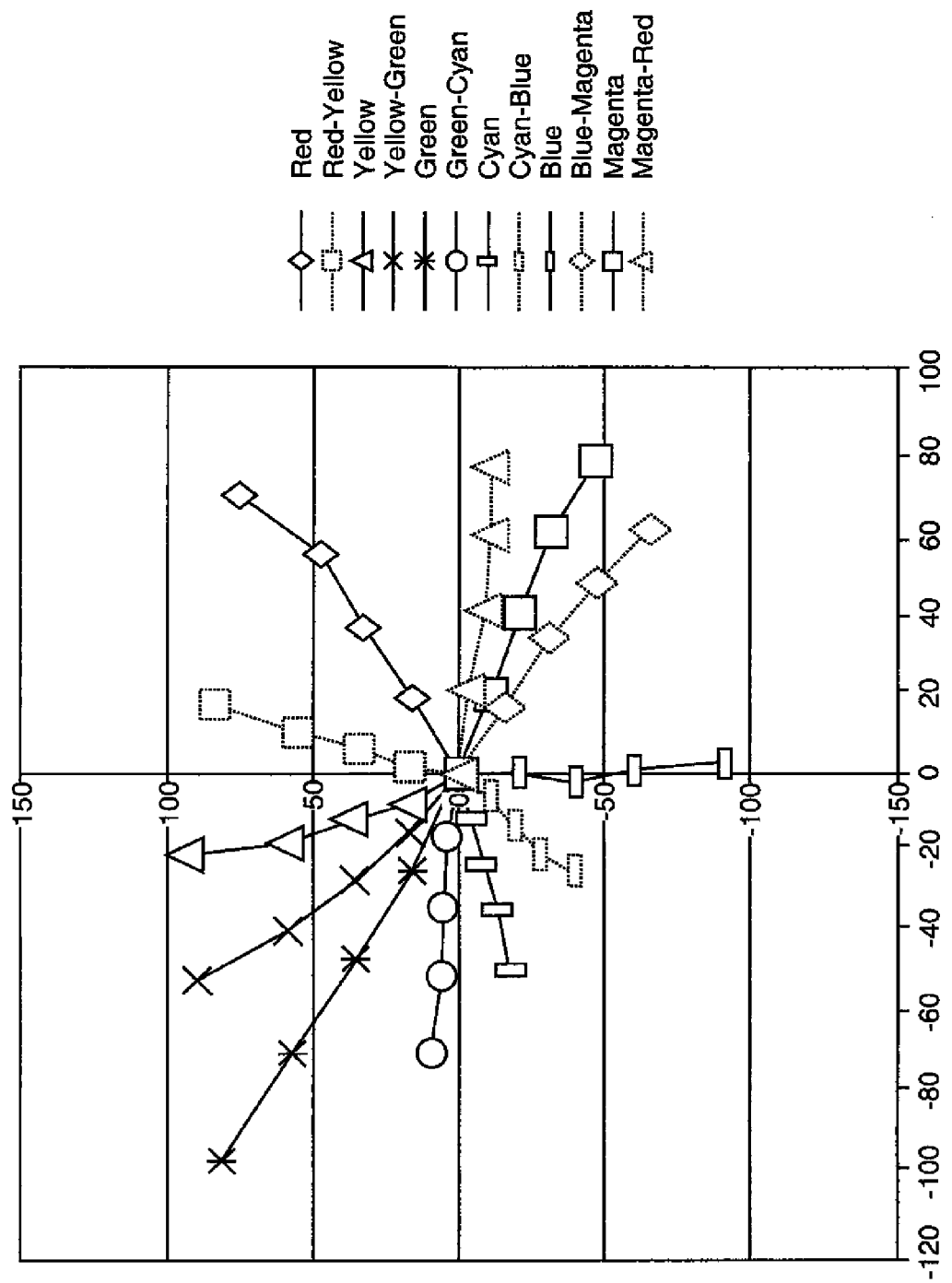
FIG. 6 shows a plot of lines of constant hue documented by Hung-Berns with beta correction in accordance with an embodiment of the invention.

As an illustrative example, for $\beta_0=1.0$, $\kappa=2$, we obtain 3 plots, the first for constant xy (variable Y) for sRGB which shows no effect from beta correction and is shown in FIG. 4. In FIG. 5 there is show a plot of lines of sRGB color ranging from saturated to gray with constant Y with and without beta correction. In FIG. 6, there is shown a plot of lines of constant hue such as those coumented by Hung-Berns using the beta correction of one of the embodiments of the invention.

Thus, our generalization is that if it can be confirmed that the Hung-Berns effect applies to lines of constant chomaticity xy with varying luminosity Y, beta will be a function of LMS:

$$\beta=\beta_0 f(\vec{LMS}) \quad \text{Eq. 23}$$

If it can be confirmed that lines of hue are constant for constant chomaticity xy, then we can assume that beta is primarily a function of the LMS chromaticites (lms):

$$\beta=\beta_0 f(\vec{lms}) \quad \text{Eq. 24}$$

The following four pages show an original RGB image following by RGB simulations of print using the methods described above. The first simulation is performed using no Hung-Berns correction and using black point compensation (BPC) similar to that used in PhotoShop to apply gamut mapping. The next image shows a more complex gamut mapping method in conjunction with the Hung-Berns correction as described in the Hung-Berns paper. The last image utilizes the black point compensation described which is herein incorporated by reference and combined with the correction described above using LMS chromaticities lms (equations 23 and 24).

Figure 7:
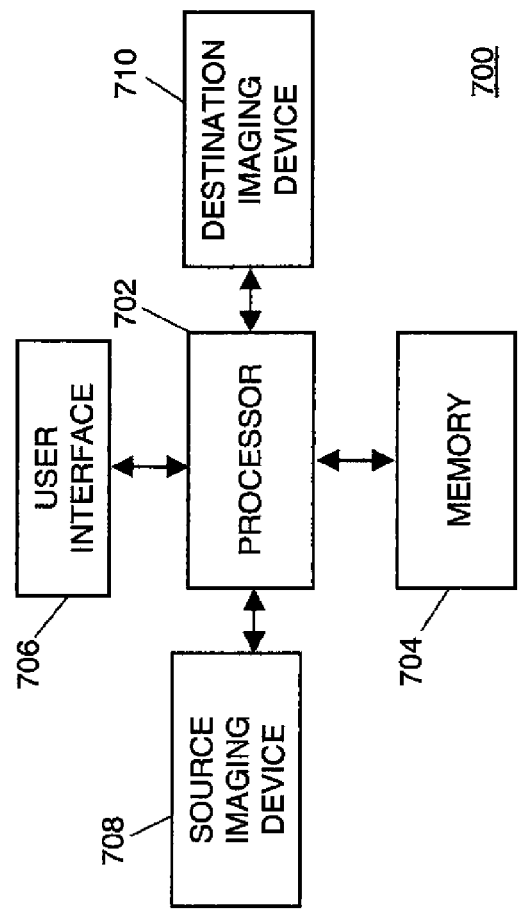
FIG. 7 is a block diagram of a system in accordance with the invention.

FIG. 7 is a block diagram illustrating an exemplary operating environment for application of the color correcting techniques previously discussed above in accordance with an embodiment of the invention. In particular, FIG. 7 shows a general purpose-computing environment 700 comprising a processor 702, memory 704, user interface 706, source-imaging device 708 and destination imaging device 710. Processor 702 may execute a color characterization and correction module using the techniques discussed previously above.

Source imaging device 708 and destination imaging device 710 may be display devices or printers. Alternatively, source-imaging device 708 may be an image capture device such as a scanner or camera. In either case, source imaging device 708 and destination imaging device 710 operate according to an applicable set of device-dependent coordinates. As an example, source imaging device 708 may be an image capture device that produces source device data defined by RGB coordinates, while destination imaging device 710 may be a printer that produces destination device data defined by CMYK coordinates. Memory 704 can include both volatile (e.g., RAM) and nonvolatile (e.g., ROM) storage and can store all of the previously discussed characterization and correction techniques.

Figure 8:
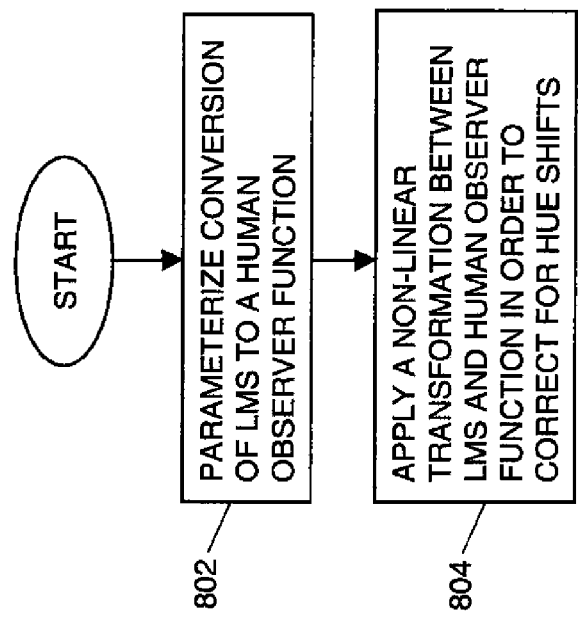
FIG. 8 is a flow diagram highlighting a method for correcting hue shifts in accordance with one embodiment of the invention.

User interface 706 may include a display device, such as a cathode ray tube (CRT), liquid crystal display (LCD), plasma display, digital light processing (DLP) display, or the like, for presentation of output to a user. In addition, user interface 706 may include a keyboard and pointing device, such as a mouse, trackball or the like to support a graphical user interface. In operation, a user interacts with processor 702 via user interface 706 to direct conversion of source device data to destination device data, e.g., as shown in FIGS. 7 and 8. Memory 704 stores process-readable instructions and data for execution by processor 702. The instructions include program code that implement the hue shift characterization and correction techniques described herein. Processor 702 may operate in any of a variety of operating systems, such as Windows, Mac OS, Linux, Unix, etc.

Processor 702 may take the form of one or more general-purpose microprocessors or microcontrollers, e.g., within a PC or MAC computer or workstation. In alternative embodiments, the processor 702 may be implemented by one or more digital signal processors (DSPs), application specific integrated circuits (ASICs), field programmable logic arrays (FPGAs), or any equivalent integrated or discrete logic circuitry, or any combination thereof. Memory 704 may include or utilize magnetic or optical tape or disks, solid state volatile or non-volatile memory, including random access memory (RAM), read only memory (ROM), electronically programmable memory (EPROM or EEPROM), or flash memory, as well as other volatile or non-volatile memory or data storage media.

In FIG. 8 there is shown a simplified flow diagram illustrating a method for correcting hue shifts in accordance with an embodiment of the invention. In 802, the conversion of LMS spectral sensitivities to a human observer function such as XYZ tristimulus values is parameterized. In 804, a non-linear transformation between the LMS and human observer function is applied in order to correct for the shifts in hue. Different non-linear transformations as previously described can be used including those using a correction factor as also discussed.

The invention has been described in detail with particular reference to certain preferred embodiments thereof, but it will be understood that variations and modifications can be effected within the scope of the invention.

The invention claimed is:

1. A memory that stores process-readable instructions that when executed by a processor implement a method for correcting for hue shifts, the method comprising:
   parameterizing the conversion of long-medium-short (LMS) spectral sensitivities of the human eye to a human observer function; and
   applying a non-linear transformation between the LMS and human observer function in order to correct for the hue shifts,
   wherein the human observer function comprises XYZ tristimulus values, and
   wherein the non-linear transformation includes a correction factor ($\beta$) equal to:
   $\beta = \beta_o \max(0, S - \max(L, M))$.

2. A memory that stores process-readable instructions that when executed by a processor implement a method for characterizing and correcting for shifts in hue, the method comprising:
   (a) representing long-medium-short (LMS) spectral sensitivities of the human eye and XYZ human observer function as:

$$\begin{pmatrix} X(\lambda) \\ Y(\lambda) \\ Z(\lambda) \end{pmatrix} = M_{LMS \to XYZ}(s(\lambda')) \begin{pmatrix} L(\lambda) \\ M(\lambda) \\ S(\lambda) \end{pmatrix}$$

wherein M is the LMS to XYZ conversion matrix modified to vary as a function of observed spectral stimulant and ($s(\lambda')$) is the measured spectra of the color stimulus;
   (b) adjusting for changes to the LMS and XYZ by representing the changes as:

$$\begin{pmatrix} X(\lambda) \\ Y(\lambda) \\ Z(\lambda) \end{pmatrix} = (M_{LMS \to XYZ} + \Delta M_{LMS \to XYZ}(\overrightarrow{LMS})) \begin{pmatrix} L(\lambda) \\ M(\lambda) \\ S(\lambda) \end{pmatrix}; \text{ and}$$

(c) correcting for the changes in (b) by providing a correction factor ($\lambda$) selected from the group of correction factors:

$\lambda = \lambda_o \max(0, S - \max(L, M))$ and $\lambda = \lambda_o \max(0, s - \max(l, m))^k$; and (d) applying the correction factor as $\Delta M_{LMS \to xyz}(\lambda)$ in (b).

3. A method as defined in 2, wherein:

$$\Delta M_{LMS \to XYZ}(\beta) = \begin{pmatrix} 0.202\beta & 0.0 & -0.202\beta \\ 0.0 & 0.0 & 0.0 \\ 0.0 & 0.0 & 0.0 \end{pmatrix}.$$

4. A memory that stores process-readable instructions that when executed by a processor implement a method for characterizing and correcting shifts in hue, the method comprising:
   (a) representing long-medium-short (LMS) spectral sensitivities of the human eye and XYZ human observer function as:

$$\begin{pmatrix} X(\lambda) \\ Y(\lambda) \\ Z(\lambda) \end{pmatrix} = M_{LMS \to XYZ}(s(\lambda')) \begin{pmatrix} L(\lambda) \\ M(\lambda) \\ S(\lambda) \end{pmatrix}$$

wherein M is the LMS to XYZ conversion matrix modified to vary as a function of observed spectral stimulant and ($s(\lambda')$) is the measured spectra of the color stimulus;
   (b) substituting the modified calculations for XYZ in (a) for existing values of XYZ wherever they are explicitly or implicitly used for characterizing color; and
   (c) performing any necessary gamut mapping conversions using methods that minimize hue error as characterized using the above modified XYZ functions.

5. A method based on claim number 4 above for characterizing and correcting for shifts in hue, further comprising:
   (d) characterizing the matrix M by the expression:

$$\begin{pmatrix} X(\lambda) \\ Y(\lambda) \\ Z(\lambda) \end{pmatrix} = (M_{LMS \to XYZ} + \Delta M_{LMS \to XYZ}(\overrightarrow{LMS})) \begin{pmatrix} L(\lambda) \\ M(\lambda) \\ S(\lambda) \end{pmatrix};$$

in which a correction function $\epsilon(L, M, S)$ is used to define the correction matrix $\Delta M$ according to the following definition:

$$\Delta M_{LMS \to XYZ}(\beta) = \begin{pmatrix} 0.202\beta(\overrightarrow{LMS}) & 0.0 & -0.202\beta(\overrightarrow{LMS}) \\ 0.0 & 0.0 & 0.0 \\ 0.0 & 0.0 & 0.0 \end{pmatrix}.$$

6. A method as defined in claim 5, further comprising:
   (e) correcting for changes in $\Delta M(\lambda)$ by providing a correction function $\epsilon(L, M, S)$ selected from the group of correction functions:

$$\beta(\overrightarrow{LMS})=\beta_o\max(0,S-\max(L,M))$$

and $$\beta(\overrightarrow{LMS})=\beta_o\max(0,s-\max(l,m))^k,$$

where $$l = \frac{L}{L+M+S},$$
$$m = \frac{M}{L+M+S}, \text{ and}$$
$$s = \frac{S}{L+M+S}.$$

7. A system for correcting for shifts in hue in an image, comprising:
   a controller for parameterizing the conversion of long-medium-short (LMS) spectral sensitivities of the human eye to a human observer function and applying a non-linear transformation between the LMS and human observer function in order to correct for the hue shifts in the image; and
   an output device for presenting the hue corrected image,
   wherein the human observer function comprises XYZ tristimulus values, and
   wherein the non-linear transformation includes a correction factor ($\beta$) equal to:

$$\beta=\beta_o\max(0,S-\max(L,M)).$$

8. A memory that stores process-readable instructions that when executed by a processor implement a method for correcting for hue shifts, the method comprising:
   parameterizing the conversion of long-medium-short (LMS) spectral sensitivities of the human eye to a human observer function; and
   applying a non-linear transformation between the LMS and human observer function in order to correct for the hue shifts,
   wherein the human observer function comprises XYZ tristimulus values, and
   wherein the non-linear transformation includes a correction factor ($\beta$) equal to:

$$\beta=\beta_o\max(0,s-\max(l,m))^k,$$

wherein l, m and s are chromaticities based on LMS and k is an exponential correction to account for non-linear variations in correction factor $\beta$.

* * * * *

UNITED STATES PATENT AND TRADEMARK OFFICE
CERTIFICATE OF CORRECTION

PATENT NO. : 7,705,857 B2
APPLICATION NO. : 11/950826
DATED : April 27, 2010
INVENTOR(S) : Christopher J. Edge It is certified that error appears in the above-identified patent and that said Letters Patent is hereby corrected as shown below:

| Issued Patent | | Description of Error |
|---|---|---|
| Column | Line | |
| 11 | 47 | In Claim 1, delete "$\beta=\beta_o \max(O,S-\max(L,M))$." and insert -- $\beta=\beta_o \max(0,S-\max(L,M))$. -- |
| 12 | 9 (Approx.) | In Claim 2, delete "$(\lambda)$" and insert -- $(\beta)$ -- |
| 12 | 11-12 (Approx.) | In Claim 2, delete "$\lambda=\lambda_o \max(0,S-\max(L,M))$ and $\lambda=\lambda_o \max(0,s-\max(l,m))^k$; and" and insert -- $\beta = \beta_o \max(0,S-\max(L,M))$ and $\beta = \beta_o \max(0,s-\max(l,m))^k$; and -- |
| 12 | 13 (Approx.) | In Claim 2, delete "$(\lambda)$" and insert -- $(\beta)$ -- |
| 12 | 15 (Approx.) | In Claim 3, delete "2," and insert -- claim 2, -- |
| 12 | 55 | In Claim 5, delete "$\epsilon(L,M,S)$" and insert -- $\beta(L,M,S)$ -- |
| 12 | 65 | In Claim 6, delete "$\Delta M(\lambda)$" and insert -- $\Delta M(\beta)$ -- |
| 12 | 66 | In Claim 6, delete "$\epsilon(L,M,S)$" and insert -- $\beta(L,M,S)$ -- |

Signed and Sealed this

Fifth Day of October, 2010

David J. Kappos
*Director of the United States Patent and Trademark Office*